United States Patent
Hill

[15] 3,688,588
[45] Sept. 5, 1972

[54] APPARATUS FOR DETERMINING THE DENSITY OF A FLUID

[72] Inventor: Jan Erik Hill, Stockholm, Sweden

[73] Assignee: Ingenjors C. G. Hansson AB, Tyreso, Sweden

[22] Filed: Oct. 12, 1970

[21] Appl. No.: 80,007

[30] Foreign Application Priority Data

Oct. 14, 1969 Sweden..........................14058

[52] U.S. Cl....................................................73/451
[51] Int. Cl..............................................G01n 9/10
[58] Field of Search..........73/451, 452, 453, 454, 32, 73/30, 317, 309, 228, 194 M, 231 M; 116/118

[56] References Cited

UNITED STATES PATENTS

| | | | |
|---|---|---|---|
| 2,688,868 | 9/1954 | Elkins | 73/453 |
| 3,589,200 | 6/1971 | Nilsson | 73/438 |
| 3,147,612 | 9/1964 | Evans | 73/228 X |
| 3,495,464 | 2/1970 | Lebedeu et al. | 73/452 |

FOREIGN PATENTS OR APPLICATIONS 221,622  8/1942  Sweden

Primary Examiner—Richard C. Queisser
Assistant Examiner—Marvin Smollar
Attorney—Jacobs & Jacobs

[57] ABSTRACT

An improved apparatus for determining the density of a fluid, in particular the density of a liquid at a pressure above or below ambient pressure. In a vessel containing the fluid, the density of which is to be measured, is arranged an elongated tube manufactured from a suitable material, such as steel, which is stiff as well as resilient. The tube has thin walls and a large ratio of length to cross section. This tube is rigidly attached, at one or both ends, to a fixed member, such as the wall or walls respectively of the vessel. The tube is sealed with respect to the fluid, and the interior of the tube may be hermetically sealed, or it may be in communication with the ambient atmosphere. The density of the fluid, in which the tube is completely submerged, will cause a buoyancy force to act on the tube. Due to the stiffness and resiliency of the material, and the shape, i.e. the thin walls and the comparatively great length of the tube, the tube will be elastically deflected or bent in the direction of the buoyancy force, and the deflection or bending can be shown to be a substantially linear function of the force within wide density limits. The deflection or bending may thus be used as a direct measure of the density, provided of course, that a previous calibration has been made for fluids of known density. This deflection or bending may be measured in many different ways, but it is believed, that the most sensitive and robust way would be to use a differential capacitor arrangement, with the tube serving as the movable part and with a stiff stationary support member arranged inside the tube and carrying a split cylindrical capacitor comprising two cylindrical shells of 180° or less each, arranged diametrically with respect to each other. This has in fact proved to give excellent measuring accuracy.

10 Claims, 8 Drawing Figures

PATENTED SEP 5 1972
3,688,588
SHEET 1 OF 2
FIG. 1
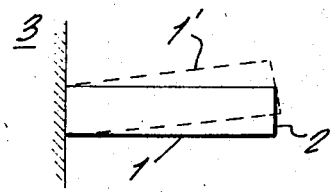
FIG. 2
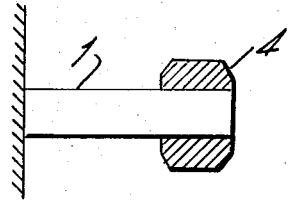
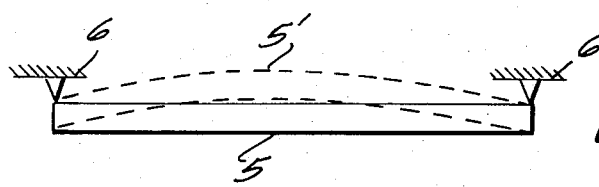
FIG. 3
FIG. 4
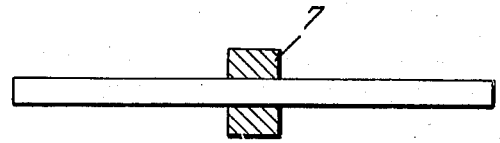
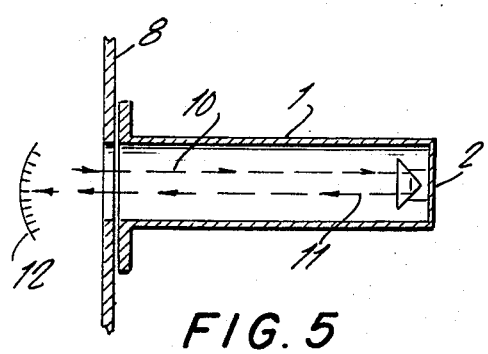
FIG. 5
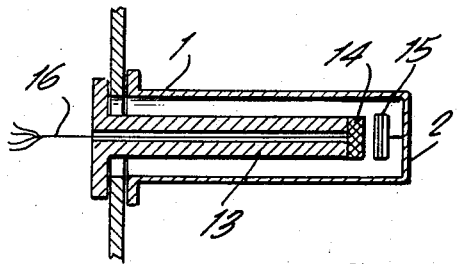
FIG. 6
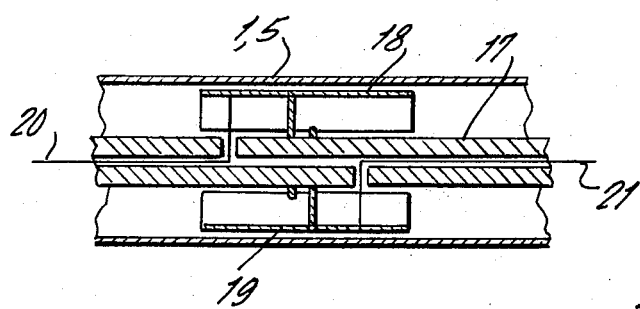
FIG. 7
JAN ERIK HIL
BY Jacobs & Jacob
His Attorneys JAN ERIK HILL
BY Jacobs & Jacobs
His Attorneys

APPARATUS FOR DETERMINING THE DENSITY OF A FLUID

BACKGROUND OF THE INVENTION

As is known in the art, the buoyancy force on a float immersed in a liquid, the density of which is to be measured, may be used to determine the density.

It is, however, rather difficult to utilize this principle for measuring the density of a liquid under pressure, e.g., when the liquid is enclosed in a vessel at a pressure higher or lower than the ambient pressure.

The reason for this is the necessity to transfer the movement of the float, e.g., by linkage systems or the like, to a device outside the vessel. It has proved difficult to effectively seal the place where the linkage passes through the walls of the vessel, and it has in particular proved difficult to prevent the sealing members from exerting damping friction on the movement, something which of course would lower the measuring accuracy. It has also been proposed to reduce the actual length of travel of the float by using a rather large spring pre-tension but this has also resulted in unsufficient measuring accuracy and hysteresis effects.

The present invention presents a solution to these problems by making use of the principle of what might be called a "static float". This designation, however, is not entirely correct, since the float will move in response to density variations, but the movements are very small and are not transmitted out of the vessel at the point or points where the float is attached to the walls of the vessel, so that the seal or seals at this point or points do not have to be flexible.

One important advantage of an apparatus according to the invention is that it makes possible density measurements of a fluid at a pressure higher or lower than the ambient pressure. One of the main difficulties when measuring the density of a liquid subject to a pressure higher than the ambient pressure is to find a useful and friction-free way to transmit out a force which acts on the transducer and which may be a fraction of the order of $10^{-5}$ times the hydrostatic overpressure. The present invention provides a method and an apparatus where this problems is solved by the use of tubes having a small diameter and thin walls and which are used either as a float themselves or as elastic holding members for the float.

SUMMARY OF THE INVENTION

The principle referred to above, i.e., the use of a "static float", is used according to the invention in an improved apparatus for determining the density of a fluid contained in a vessel by means of the buoyancy force acting on a body (float) completely submerged in said fluid. In the apparatus according to the invention, therefore, said body comprises an elongated tube, impervious to said fluid, and having thin walls and a large length/cross-section ratio and manufactured from a stiff, resilient material, means for rigidly attaching one or both ends of said tube and for holding said tube substantially perpendicular to said buoyancy force, and means for determining the deflection or bending of said tube, caused by said buoyancy force.

In a preferred embodiment of the invention a concentric arrangement is used comprising an inner, stiff support member carrying the static pair of electrodes of a differential capacitor arrangement. The support member and the electrode system are enclosed in a hollow body, essentially consisting of two thin tubes of the kind described above, hermetically joined to an intermediate section of larger diameter serving at the same time as a float and as the movable part of the differential capacitor arrangement. This hollow body is in turn enclosed in a tubular vessel, provided with inlet and outlet means for the fluid, so as to provide an apparatus for continuously measuring the density of a fluid. This apparatus is especially suited for measuring the density of a liquid in a pressurized system, a problem which up till now has been very difficult, and in some cases impossible to solve with any degree of accuracy.

The invention will now be further described with reference to the attached drawings in which FIGS. 1–7 schematically and in cross section show different embodiments of devices according to the invention; and where FIG. 8 shows a detailed cross section of a preferred embodiment of the invention.

DETAILED DESCRIPTION OF THE INVENTION

Figure 8:
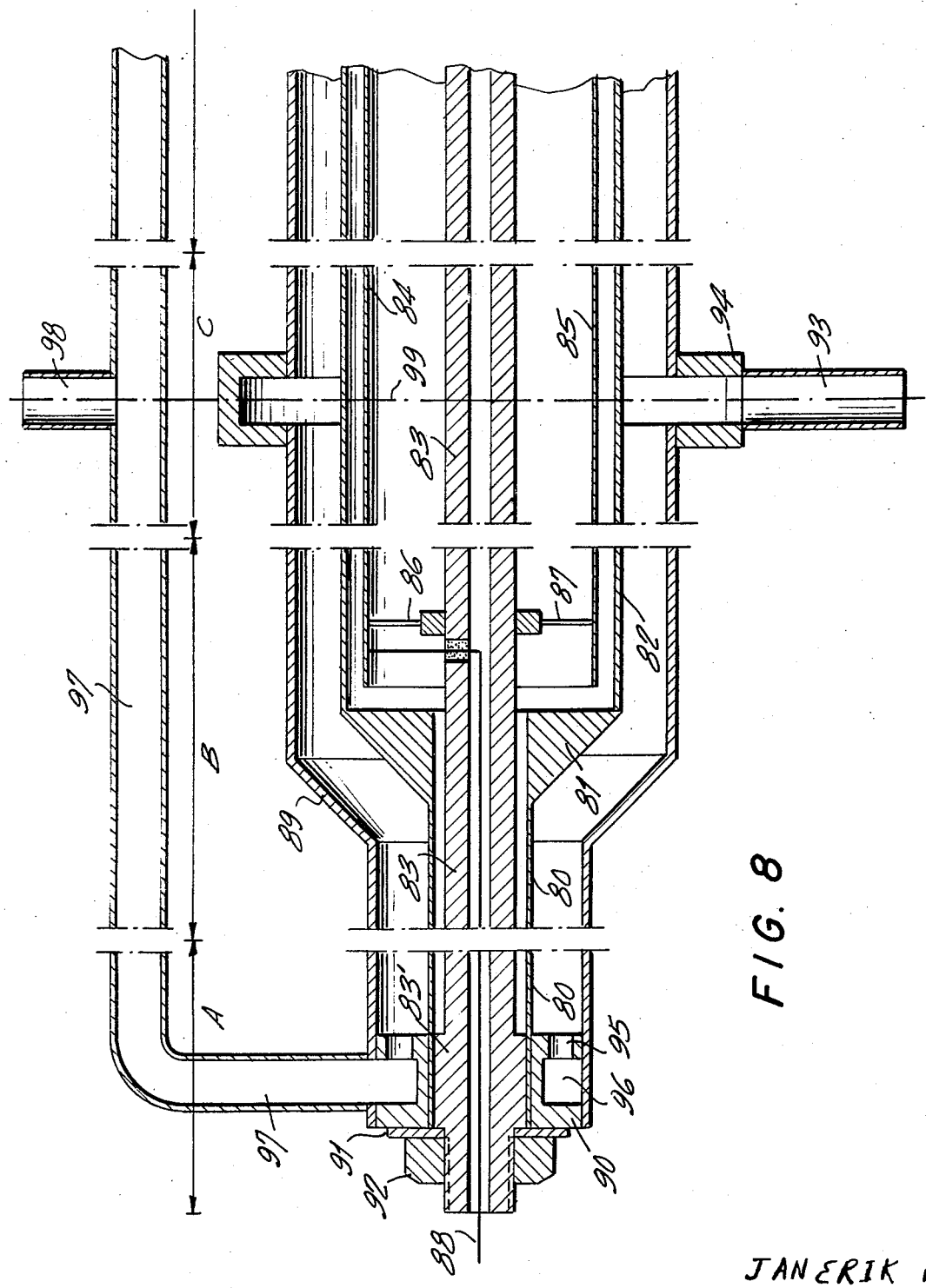

Thus in FIG. 1 the reference numeral 1 designates a tube having a comparatively small diameter and thin walls as seen in cross section. The tube is closed at one end by an end plate 2 and the other end of the tube 1 is fixed to a stationary member such as for instance a wall 3 of a vessel containing the fluid the density of which is to be measured. It should be born in mind that the figure is not drawn to scale and that the actual ratio of length to the diameter of the tube may be much larger than shown in the figure, i.e., preferable from 10 to 100. The dashed lines 1' designate in an exaggerated manner a situation where the free end of the tube is bent or deflected upwards. Provided the tube has suitable proportions and is manufactured from a suitable, resilient material, and surrounded by a fluid having a comparatively large density, the tube will be deflected in the manner shown by the buoyancy caused by the displaced fluid.

In order to further increase the buoyancy force the tube 1 may be provided with an enlarged portion 4 in the vicinity of its free end as shown in FIG. 2. The enlarged portion 4 may either be a bulb integral with the material of the tube 1 or, as shown, be a separate float made from a suitable material.

FIGS. 3 shows a modified arrangement where an elongated tube 5 has its both ends fixed to rigid supports 6. The tube 5 may then be deflected as indicated by the dashed lines 5' when immersed in a fluid having a comparatively high density. Of course both ends of the tube 5 have to be sealed with respect to the fluid.

As shown in FIG. 4 the tube 5 may be provided with an additional float 7 either forming a bulb integral with the tube or a separate float as shown in the drawing. This will of course increase the buoyancy force acting on the tube.

FIG. 5 shows a first possibility for determining the deflection of a tube 1, e.g., in an arrangement similar to FIGS. 1 or 2. The tube 1 is sealingly and rigidly attached to the walls of a vessel 8 containing the fluid, the density of which is to measured. Inside the tube 1 an optical prism 9 is attached to the end wall 2 in such a manner that a ray of light 10 from a suitable light source (not shown) situated outside the tube, results in a reflected light ray 11 which is projected on a suitable scale 12. It is obvious from the description and the drawing that if the tube 1 is deflected this will impart a corresponding movement to the optical prism 9 and the reflected light ray 11 will impinge on the scale 12 at a different spot corresponding to the deflection at the tube. Of course other similar optical devices known per se may be used in place of the prism 9 and scale 12 in order to give a direct or indirect indication of the deflection of the tube.

A similar optical device may of course be used inside the embodiments shown in FIGS. 3 and 4 either to reflect a light ray at the midpoint of the tube 5 or to deflect a light ray by means of for instance a double prism as it passes through the tube.

The support 6 for the tube 5 shown in FIG. 3 may be similar to the one shown for the tube 1 in FIG. 5, i.e., the tube 5 may be attached at both ends by a flange and seal arrangement. Preferably the tube 5 extends between two walls of the vessel in which the fluid is enclosed.

In the apparatus schematically shown in FIG. 6 a rod 13 protrudes into the tube 1 with an overall clearance between the rod and the inside walls of the tube. The rod 13 is rigidly attached to the wall 8 of the vessel in a suitable manner. At the inner free end of the rod 13 a transducer 14 is attached which transducer cooperates with a member 15 attached to the inside of the end plate 2. The connection between the transducer 14 and the component 15 or directly between the transducer 14 and the endwall 2 may either be mechanical or for example magnetic. In the embodiment shown the transducer 14 may be a coil arrangement of a kind known per se and based on the differential transformer principle. The component 15 is then the differential transformer core which is movable with respect to the coil. By means of a plurality of wires 16 the coils are connected to a suitable device known per se for determining changes in the relative position of the components 14 and 15 and thereby also determining the deflection of the tube 1.

FIG. 7 illustrates another possibility which is particularly suited for determining the small displacements which are to be measured in a density measuring device according to the invention. Enclosed in a tube 1 or 5 is a stationary stiff rod 17, preferably manufactured from a non-conducting material such as ceramics or the like. The rod 17 carries two cylindrical shells or segments 18 and 19 coaxial with the inner walls of the tube 1 and situated opposite each other in such a manner, that if the tube 1, 5 is bent, the distance between one of the segments, i.e., 18 and the inner wall of the tube 1 will increase whereas the distance between the other segment, i.e., 19 and the inner wall of the tube 1, 5 will decrease. The segments 18, 19 are manufactured from a conducting material, e.g., sheet metal, so that the corresponding variations in capacitance between the respective segments and the inner wall of the tube 1, 5 may be used as a quantity indicative of the displacements of the tube. Thus the segments 18 and 19 are electrically isolated from each other and connected to wires 20, 21 respectively, leading to a differential capacity measurement device (not shown) to which the tube 1, 5 as well is connected. Thus variations in the relative displacement between the tube 1 and the segments 18, 19 may be indicated on a suitable capacity measuring device known per se.

The simplified embodiments so far described are included for illustrative purposes and a reference is now made to FIG. 8 which is a cross section through a preferred embodiment of an apparatus according to the invention. The preferred embodiment illustrated in FIG. 8 is analogous to the embodiment schematically shown in FIGS. 3 and 4, and has a transducer arrangement similar to the one shown in FIG. 7. FIG. 8 shows the three main parts of an embodiment according to the invention, namely, a first part, generally designated A, showing one of the opposite ends of the apparatus, a middle part, generally designated B, which shows the portion where the thin tube is widened to form a thicker float in which a differential capacitor arrangement similar to the one shown in FIG. 7 is housed, and the part generally designated C, finally, which shows the middle portion of the apparatus.

With reference to FIG. 8 the numeral 80 designates a comparatively thin tube having thin walls and being manufactured from a suitable, resilient and stiff material, such as stainless steel. In the region designated B the tube 80 continues in a conical portion 81 to a tube 82 serving as a float and having considerably larger diameter than the tube 80. Coaxial with the tube 80 and the tube 82 is a rigid, hollow rod 83 of non-conducting material, preferably ceramics or the like, which has an overall clearance to the inside walls of the tube 80, except in the region A, immediately adjacent the end of the apparatus. As shown in the drawing the rod 83 carries two cylindrical shells or segments 84 and 85 situated inside the larger tube 82 and analogous to the members 18 and 19 shown in FIG. 7. The members 84 and 85 may each extend to an angle from say 90 ° to an angle approaching 180 °, but must be isolated from each other and from the rest of the measuring device, in particular from the tube 80, 82. By means of suitable holding members 86 and 87 the segments 84 and 85 respectively are attached to the rod 83. A wire 88 is at one end attached to the segment 84 and the other end of the wire may be connected to a suitable differential capacitor measuring device (not shown), and the opposite segment 85 is in a similar manner connected to the other terminal of said measuring device, by means of a similar wire, not shown in the drawing. The wire 88 passes axially through the rod 83 as shown.

The tubular member formed by the tubes 80 and 82 is coaxially arranged inside of a tubular cover 89 of essentially the same shape and having such an inner diameter that there is an overall clearance between the tubes except where the tubes are joined in the region A as shown in the drawing. In the region A the rod 83, the inner tube 80 and the outer tube 89 are joined to each other. In the example shown, an enlarged part 83' of the rod 83 sealingly engages the inner surface of the tube 80 and the tube 80 is provided with an outer annular member 90 which forms a seal between the outer surface of the tube 80 and the inner surface of the tube 89. A washer 91 and a nut 92 completes the seal from the outside. The end of the rod 83 outside of the nut 92 may be shaped as or provided with a coaxial contact, not shown in the drawing, for connecting the wire 88 and the outer metal parts of the measuring device to a capacitor measuring instrument.

The apparatus so far described is particularly suitable for determining the density of a fluid, in particular a liquid, which is under pressure, irrespective of whether the pressure is higher or lower than the ambient pressure. By selecting a suitable material, for example stainless steel, for the tube 89, the annular sealing member 90 and the tubes 80, 81, 82, the apparatus may be used for measuring the density of agressive liquids such as strong acids or bases even at very high or low pressures. If the rod 83 is manufactures from a ceramic material and the electrode system 84, 85, 86, 87 is manufactured from thermoresistant material and the parts joined to each other with solder having high melting point, the apparatus may also be used for measuring the density of fluids having high temperatures, even if the fluids themselves are agressive.

The apparatus shown is in particular suitable for measuring the density of a streaming fluid, in particular a liquid, which may enter through the tube 93 into an annular member 94 surrounding the tube 89 at the midpoint of the apparatus. By means of suitable deflecting members (not shown) or by directing the inlet tube 93 tangentially with respect to the tube 82 the streaming liquid may be distributed substantially uniform around the tube 82 in the annular space between tubes 89 and 82 and may be divided into two half-streams one of which flows towards the region A shown in the drawing. Through an annular opening 95 or through several annularly placed holes the liquid flows into the annular recess 96 of the member 90. From the annular recess 96 the half-stream continues through an outlet tube 97 and out through an outlet 98 centrally placed with respect to the apparatus, where it joins the opposite half-stream which has passed the apparatus in the opposite direction.

It is also feasible to have the liquid travel in the opposite direction, i.e., entering the apparatus through the tube 98 and leaving the apparatus through the tube 93. When this arrangement is used, the tube 93 may preferably face upwards so that no gas bubbles are collected in the apparatus. Practical tests will determine the direction of flow that gives rise to the least noise on the output signal but the last mentioned direction of flow and orientation of the apparatus is usually to be preferred.

Generally the apparatus and method described may be said to be based on an integration of the differential pressure caused by the gravity field. Using an elastic medium, the force is translated into a change in position which changes the capacitance in a differential capacitor system. By measuring the capacitance difference a density change may be determined with respect to sign as well as magnitude relative to an initial value.

The arrangement is circular symmetric as well as symmetric about a central plane 99. Due to the circular symmetry the effect of an hydrostatic over-or underpressure is eliminated since the spherical pressure distribution of the liquid and the symmetry results in a force the net value of which is zero. A high flow speed may be tolerated due to the symmetry about the central plane and the time constant of the transducer may be almost twice the total length of the transducer.

WHAT WE CLAIM IS:

1. An apparatus for determining the density of a fluid contained in a vessel, by means of the buoyancy force acting on a body completely submerged in said fluid, said body comprising an elongated tube, impervious to said fluid, and having thin walls and a large length/cross-section ratio and manufactured from a stiff, resilient material, said elongated tube having one end closed and the opposite end open, means for rigidly and sealingly attaching said tube adjacent said open end to a wall of said vessel with said tube substantially perpendicular to said buoyancy force, light ray deflecting means inside said tube adjacent to said closed end, and light ray directions indicating means adjacent said open end outside said vessel for determining the direction of a reflected light ray, and thereby also deflection of said tube.

2. An apparatus for determining the density of a fluid contained in a vessel by means of the buoyancy force acting on a body completely submerged in said fluid, said body comprising an elongated tube, impervious to said fluid, and having thin walls and a large length/cross-section ratio and manufactured from a stiff, resilient material, said elongated tube having one end closed and the opposite end open, means for rigidly and sealingly attaching said tube adjacent said open end to a wall of said vessel with said tube substantially perpendicular to said buoyancy force, stiff, stationary holding means extending inside said tube, towards said end, and transducer sensing means attached to said holding means for determining the position of said tube adjacent said closed end with respect to said stationary holding means, and to generate an electrical signal indicative thereof.

3. An apparatus according to claim 2, further comprising a float body attached to said elongated tube adjacent said closed end.

4. An apparatus according to claim 2 wherein said transducer sensing means are displacement transducer means.

5. An apparatus according to claim 2 wherein said transducer sensing means are proximity transducer means.

6. An apparatus for determining the density of a fluid contained in a vessel by means of the buoyancy force acting on a body completely submerged in said fluid, said body comprising an elongated tube, impervious to said fluid, and having thin walls and a large length/cross-section ratio and manufactured from a stiff, resilient material, said elongated tube having both ends rigidly and sealingly attached to opposite wall portions of said vessel with said tube substantially perpendicular to said buoyancy force, a stiff holding member co-axial with said tube and attached to said tube at said opposite ends, and transducer sensing means attached to said holding member intermediate said opposite ends for determining the position of the inner wall of said tube with respect to said holding member and to generate an electrical signal indicative thereof.

7. An apparatus according to claim 6 wherein said transducer sensing means are displacement transducer means.

8. An apparatus according to claim 6 wherein said transducer sensing means are proximity transducer means.

9. An apparatus according to claim 6 in which said transducer means comprise first and second opposite cylindrical, electrically conductive shells of 180° or less, said first shell and second shell located diametrically with respect to each other adjacent upper and lower portions respectively of the inside wall of said elongated tube intermediate said opposite ends thereof, so as to make the distance between said first shell and said inside wall increase, and the distance between said second shell and said inside wall decrease when said elongated tube is bent under the influence of an increasing buoyancy force.

10. An apparatus for determining the density of a fluid contained in a vessel by means of the buoyancy force acting on a body completely submerged in said fluid, said vessel comprising a first tube, having a comparatively large diameter, and closed at both ends, inlet means for supplying said fluid to said vessel, and outlet means for withdrawing said fluid from said vessel, a body inside said vessel and essentially co-axial therewith, said body comprising a first tubular part, an intermediate tubular part and a second tubular part, said first and second tubular parts each comprising an elongated tube, impervious to said fluid, and having thin walls and a large length/cross-section ratio and manufactured from a stiff, resilient material, said intermediate part having a considerably larger cross section and an outer diameter less than the inner diameter of said corresponing, intermediate portion of said vessel, said first tubular member, said intermediate tubular member and said second tubular member being rigidly joined to one another to form a fluidtight elongated rotation and circular symmetrical hollow body having opposite end walls, said opposite ends being rigidly and sealingly attached to opposite ends of said vessel, so as to form with said vessel a sealed space having annular cross section, and containing said fluid, and an elongated stiff holding member, coaxial with said elongated, hollow body and attached at both ends at said opposite ends of said hollow body, said holding member carrying, intermediate said ends and inside said intermediate tubular part, first and second opposite, cylindrical, electrically conducting shells of 180° or less each, said first and second shell located diametrically with respect to each other adjacent upper and lower portions respectively of the inside wall of said intermediate tubular member.

* * * * *